US006814798B2

(12) United States Patent
Vijn et al.

(10) Patent No.: US 6,814,798 B2
(45) Date of Patent: Nov. 9, 2004

(54) STORABLE WATER-MICROSPHERE SUSPENSIONS FOR USE IN WELL CEMENTS AND METHODS

(75) Inventors: Jan Pieter Vijn, Leiderdorp (NL); Bach Dao, Nieuw Vennep (NL)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/271,238

(22) Filed: Oct. 15, 2002

(65) Prior Publication Data

US 2003/0177954 A1 Sep. 25, 2003

Related U.S. Application Data

(62) Division of application No. 10/102,995, filed on Mar. 21, 2002, now Pat. No. 6,644,405.

(51) Int. Cl.[7] .............................................. C04B 24/00
(52) U.S. Cl. ...................... 106/724; 106/705; 106/716; 106/737; 106/823; 166/293
(58) Field of Search .................................. 106/724, 705, 106/716, 737, 823; 166/293

(56) References Cited

U.S. PATENT DOCUMENTS

| | | | |
|---|---|---|---|
| 2,805,719 A | 9/1957 | Anderson et al. ............. 166/29 |
| 3,131,075 A | 4/1964 | Brooks, Jr. ................... 106/90 |
| 3,360,046 A | 12/1967 | Johnson et al. ............... 166/29 |
| 3,784,499 A | * 1/1974 | Krupnick | |
| 3,902,911 A | 9/1975 | Messenger | |
| 3,985,593 A | * 10/1976 | Machacek | |
| 4,081,299 A | * 3/1978 | Griffith ........................ 149/41 |
| 4,104,092 A | * 8/1978 | Mullay .......................... 149/2 |
| 4,234,344 A | 11/1980 | Tinsley et al. | |
| 4,370,166 A | 1/1983 | Powers et al. | |
| 4,384,896 A | 5/1983 | Aitcin et al. ............ 106/288 B |
| 4,515,635 A | 5/1985 | Rao et al. | |
| 4,543,137 A | * 9/1985 | Edamura et al. .............. 149/21 |
| 4,555,269 A | 11/1985 | Rao et al. | |
| 4,618,376 A | 10/1986 | Saternus et al. .............. 134/26 |
| 4,623,390 A | 11/1986 | Delmonico .............. 106/15.05 |
| 4,687,516 A | 8/1987 | Burkhalter et al. | |
| 4,721,160 A | * 1/1988 | Parcevaux et al. .......... 166/293 |
| 4,829,107 A | 5/1989 | Kindt et al. .................... 524/3 |
| 4,897,119 A | 1/1990 | Clarke ......................... 106/117 |
| 4,904,709 A | * 2/1990 | Hermele ..................... 523/220 |
| 4,933,031 A | * 6/1990 | Blomberg et al. .......... 106/679 |
| 4,935,060 A | 6/1990 | Dingsoyr .................... 106/719 |
| 5,028,482 A | * 7/1991 | Jeffs ............................. 428/323 |
| 5,158,613 A | 10/1992 | Sargeant et al. ............ 106/737 |
| 5,207,832 A | 5/1993 | Baffreau et al. ............. 106/727 |
| 5,292,512 A | * 3/1994 | Schaefer et al. ............ 424/401 |
| 5,346,012 A | 9/1994 | Heathman et al. | |
| 5,489,574 A | 2/1996 | Miano et al. ................ 507/203 |
| 5,919,842 A | * 7/1999 | Mounsey ..................... 523/412 |
| 6,060,535 A | * 5/2000 | Villar et al. ................. 523/130 |
| 6,136,867 A | 10/2000 | Frouin et al. ................. 516/80 |
| 6,138,759 A | * 10/2000 | Chatterji et al. ............ 166/293 |
| 6,153,562 A | 11/2000 | Villar et al. ................. 507/269 |
| 6,156,808 A | 12/2000 | Chatterji et al. ............ 516/116 |
| 6,173,778 B1 | 1/2001 | Rae et al. | |
| 6,196,316 B1 | 3/2001 | Bosma et al. | |
| 6,258,160 B1 | * 7/2001 | Chatterji et al. ............ 106/705 |
| 6,268,406 B1 | 7/2001 | Chatterji et al. ............ 523/130 |
| 6,297,202 B1 | 10/2001 | Chatterji et al. ............ 507/261 |
| 6,471,975 B1 | * 10/2002 | Banovetz et al. ........... 424/408 |
| 6,644,405 B2 | 11/2003 | Vijn et al. ................... 166/293 |

FOREIGN PATENT DOCUMENTS

| | | | |
|---|---|---|---|
| CN | 1250071 | * | 4/2000 |
| DD | 296 474 A5 | | 12/1991 |
| DE | 3522677 A1 | | 1/1987 |
| DE | 0 492 087 A2 | | 7/1992 |
| EP | 650942 | * | 5/1995 |
| EP | 0 748 782 A1 | | 12/1996 |
| EP | 814067 | * | 12/1997 |
| EP | 0 832 861 B1 | | 7/2001 |
| ES | 2114781 | * | 6/1998 |
| FR | 2779425 | * | 12/1999 |
| JP | 2001019421 A | | 2/2001 |
| JP | 2001354408 A | | 12/2001 |
| JP | 2002145609 A | | 5/2002 |
| JP | 2002193701 | * | 7/2002 |
| JP | 2003176123 A | | 6/2003 |
| NO | 167649 | | 7/1993 |
| WO | WO 90/11977 | | 10/1990 |
| WO | WO 93/09332 | | 5/1993 |
| WO | WO 98/38855 | | 9/1998 |

OTHER PUBLICATIONS

Halliburton brochure entitled "Spherelite Cement Additive" dated 1999.

Paper entitled "Cementing" by Dwight K. Smith, pp. 21–27, 1990.

Halliburton brochure entitled "SSA–1 Strength–Stabilizing Agent" dated 1998.

Halliburton brochure entitled "MICROSAND Cement Additive" dated 1999.

Halliburton brochure entitled "SSA–2 Coarse Silica Flour" dated 1999.

Halliburton brochure entitled "Microblock Cement Additive" dated 1999.

(List continued on next page.)

Primary Examiner—Paul Marcantoni
(74) Attorney, Agent, or Firm—Craig W. Roddy; C. Clark Dougherty, Jr.

(57) ABSTRACT

Storable water-microsphere suspensions for use in well cements and methods of cementing well bores are provided. The storable water-microsphere suspensions are basically comprised of water, microspheres and an effective amount of a suspending agent selected from the group consisting of microfine or colloidal materials and gel forming polymers.

20 Claims, No Drawings

OTHER PUBLICATIONS

Halliburton brochure entitled Silicalite Cement Additive dated 1999.

Grace Construction Products brochure entitled "Force 10,000® Mechanical Properties of Force 10,000 Microsilica Concrete", date 1999.

Grace Construction Products brochure entitled "Force 10,000® D High Performance Concrete Admixture Dry Densified Powder", dated 1999.

Grace Construction Products brochure entitled "Force 10,000® Water and Gas Permeability of Force 10,000® Microsilica Concrete" dated 1999.

\* cited by examiner

STORABLE WATER-MICROSPHERE SUSPENSIONS FOR USE IN WELL CEMENTS AND METHODS

CROSS-REFERENCE TO RELATED APPLICATION

This is a divisional of application Ser. No. 10/102,995 filed on Mar. 21, 2002, now U.S. Pat. No. 6,644,405.

BACKGROUND OF THE INVENTION

1. Field of the Invention

The present invention relates to storable water-microsphere suspensions for use in well cements and methods of cementing wells.

2. Description of the Prior Art

Hydraulic cement compositions are commonly utilized in subterranean well completion and remedial operations. For example, hydraulic cement compositions are used in primary cementing operations whereby strings of pipes such as casings and liners are cemented in well bores. In performing primary cementing, a hydraulic cement composition is pumped into the annular space between the walls of the well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe to the walls of the well bore whereby the undesirable migration of fluids between zones or formations penetrated by the well bore is prevented.

In some locations, the subterranean zones or formations into or through which wells are drilled have high permeabilities and low compressive and tensile strengths. As a result, the resistances of the zones or formations to shear are low and they have very low fracture gradients. When a well fluid such as a hydraulic cement composition is introduced into a well bore penetrating such a subterranean zone or formation, the hydrostatic pressure exerted on the walls of the well bore can exceed the fracture gradient of the zone or formation and cause fractures to be formed in the zone or formation into which the cement composition is lost. While lightweight cement compositions have been developed and used which contain microspheres for reducing the density of the cement compositions, the microspheres are usually dry blended with the cement utilized followed by mixing the dry blend with water. This procedure, however, is troublesome because it is difficult to obtain a constant cement-microsphere blend due to the differences in density between the cement and microspheres. While the microspheres can be added to the mix water, because the microspheres are lighter than the water, they float in the water.

Thus, there are needs for storable water-microsphere suspensions for use in preparing lightweight well cement compositions which can be stored at the well site or on an offshore platform for use when needed.

SUMMARY OF THE INVENTION

The present invention provides storable water-microsphere suspensions for use in well cementing compositions and methods of cementing well bores which meet the needs described above and overcome the deficiencies of the prior art. In one aspect of the present invention, storable water-microsphere suspensions for use in forming lightweight well cement compositions are provided. While being stored, the water-microsphere suspensions do not separate for at least three weeks and do not require stirring or agitation before use. The storable water-microsphere suspensions are basically comprised of water, microspheres and an effective amount of a suspending agent selected from the group consisting of microfine, i.e., sub-micron particle size or colloidal materials and gel forming polymers. The microspheres utilized in the suspensions can be fly ash microspheres, glass microspheres or recycled glass microspheres.

In another aspect of the present invention, improved methods of cementing well bores with lightweight cement compositions are provided. The methods are comprised of the following steps. A water-microsphere suspension for reducing the density of a well cement composition is stored comprised of water, microspheres and an effective amount of a suspending agent selected from the group consisting of microfine or colloidal materials and gel forming polymers. The water-microsphere suspension is combined with a cement composition comprised of a hydraulic cement and water. The cement composition including the water-microsphere suspension is introduced into the well bore, and thereafter the cement composition is allowed to set.

The objects, features and advantages of the present invention will be readily apparent to those skilled in the art upon a reading of the description of preferred embodiments which follows.

DESCRIPTION OF PREFERRED EMBODIMENTS

As mentioned above, microspheres have heretofore been blended with cement compositions to reduce the density of the cement compositions. The microspheres have generally been dry blended with the cement. However, it is often difficult to obtain a uniform microsphere-cement mixture due to the particle size and density difference of the spheres as compared to the cement particles. An alternate method of combining the microspheres with a cement composition is to add the microspheres to the mix water before combining the cement therewith. However, because the microspheres are lighter than water they float in the water making it difficult to achieve a mixture.

The present invention provides stabilized water-microsphere suspensions which are highly resistant to separation, can be stored at the job site in containers for three weeks or longer and can be added to the cement composition mixing water or to the cement composition after it has been mixed. The density of the final cement composition can be easily adjusted by adding more or less of the suspension to the cement composition. The storage of the homogenous water-microsphere suspension at the well site allows the suspension to be added to a cement composition in the required amount and any of the water-microsphere suspension not utilized can be re-stored and utilized later on another job.

A storable water-microsphere suspension of this invention for reducing the densities of well cement compositions is basically comprised of water, microspheres and an effective amount of a suspending agent selected from microfine or colloidal materials and gel forming polymers.

The water utilized to form a storable water-microsphere suspension of this invention can be fresh water or salt water. The term "salt water" is used herein to mean unsaturated salt solutions and saturated salt solutions including brine and seawater. Generally, water from any source can be utilized so long as the water does not react with any of the components in the cement composition to which the water-microsphere suspension is added.

The microspheres utilized in the water-microsphere suspensions of this invention can be fly ash microspheres, glass microspheres or recycled glass microspheres. Of these, fly ash microspheres are preferred.

Particularly suitable fly ash microspheres are commercially available from Halliburton Energy Services, Inc. of Duncan, Okla., under the tradename "SPHERELITE™". Synthetic hollow glass microspheres are commercially available from the Minnesota, Mining and Manufacturing Company under the tradename "SCOTCHLITE™". The microspheres utilized are included in a suspension of this invention in an amount sufficient to produce a suspension density in the range of from about 4.6 to about 9.5 pounds per gallon, i.e., in an amount in the range of from about 25% to about 150% by weight of the water in the suspension.

The suspending agent in the water-microsphere suspension functions to prevent separation of the microspheres from the water and to maintain a homogenous suspension while being stored. In accordance with the present invention, the suspending agent is selected from microfine or colloidal materials or gel forming polymers. Examples of microfine or colloidal materials which can be used include, but are not limited to, carbon black, lignite, brown coal, humic acid, fumed silica, precipitated silica, polyvinyl alcohol latex, styrene-butadiene latex and surfactant micelle. Of these, carbon black is presently preferred. The polymers which can be used include, but are not limited to, carragenan, scleroglycan, xanthan, guar, hydroxypropylguar, hydroxyethylcellulose, carboxymethylhydroxyethylcellulose and copolymers or terpolymers of acrylamidemethyl propylene sulfonate, N,N-dimethylacrylamide and acrylic acid. Of these, carragenan is preferred.

One or more of the above described suspending agents are generally included in the water-microsphere suspension in an amount in the range of from about 0.1% to about 75% by weight of the water in the suspension. When the suspending agent is a microfine or colloidal material as described above, the microfine or colloidal material is preferably included in the water-microsphere suspension in an amount in the range of from about 25% to about 75% by weight of water therein, more preferably in an amount of about 49%. When the suspending agent is a polymer described above, the polymer is preferably included in the water-microsphere suspension in an amount in the range of from about 0.1% to about 1.5% by weight of water therein, more preferably in an amount of about 0.5%.

The methods of cementing a well bore of the present invention are basically comprised of the following steps. A water-microsphere suspension for reducing the density of a well cement composition comprised of water, microspheres and an effective amount of a suspending agent selected from the group of microfine or colloidal materials and gel forming polymers is stored. Thereafter, the water-microsphere suspension is combined with a cement composition comprised of a hydraulic cement and water. The cement composition including the water-microsphere suspension is introduced into a well bore and the cement composition is allowed to set therein.

The hydraulic cements utilized in the cement composition can be those comprised of calcium, aluminum, silicon, oxygen and/or sulfur which set and harden by reaction with water. Such hydraulic cements include Portland cements, pozzolana cements, gypsum cements, high aluminum content cements, silica cements, high alkalinity cements and slag cements. The cements can be of conventional particle sizes or they can be of ultra-fine particle sizes. Portland cements are generally preferred for use in accordance with this invention. Portland cements of the types defined and described in *API Specification For Materials And Testing For Well Cements*, API Specification 10, 5$^{th}$ Edition, dated Jul. 1, 1990 of the American Petroleum Institute are particularly suitable. Preferred such API Portland cements include classes A, B, C, G and H, with API classes G and H being more preferred and class G being the most preferred. Portland cements of the types defined and described in European Norms 197-1:2000 *Cement—Part 1: Composition, specifications and conformity criteria for common cements* CEN publication date Jun. 21, 2000 are also preferred. The cements are classified as CEM I portland cements, CEM II portland cement-fly ash mixtures, CEM III portland cement-blastfurnace slag mixtures, CEM IV portland cement-possolan mixtures, and CEM V composite cement blends.

The water utilized in the cement composition can be fresh water or salt water. As mentioned above, the term "salt water" is used herein to mean unsaturated salt solutions and saturated salt solutions including brines and seawater. The water is generally present in the cement composition in an amount sufficient to form a pumpable slurry, generally an amount in the range of from about 38% to about 56% by weight of cement in the composition. The water-microsphere suspension utilized in accordance with the methods of this invention is generally included in the cement composition in an amount to produce a cement composition density in the range of from about 9.8 to about 15.0 pounds per gallon, i.e., in an amount in the range of from about 20% to about 300% by weight of water in the cement composition.

A preferred storable water-microsphere suspension of this invention for use in well cement compositions comprises: water; microspheres selected from the group consisting of fly ash microspheres, glass microspheres and recycled glass microspheres present in the suspension in an amount in the range of from about 25% to about 150% by weight of water therein; and a microfine or colloidal suspending agent selected from the group consisting of carbon black, lignite, brown coal, humic acid, fumed silica, precipitated silica, polyvinyl alcohol latex, styrene-butadiene latex and surfactant micelle present in the suspension in an amount in the range of from about 25% to about 75% by weight of water therein. The most preferred microfine or colloidal suspending agent for use in the above described suspension is carbon black.

Another preferred storable water-microsphere suspension of this invention for use in well cement compositions comprises: water; microspheres selected from the group consisting of fly ash microspheres, glass microspheres and recycled glass microspheres present in the suspension in an amount in the range of from about 25% to about 150% by weight of water therein; and a polymer suspending agent selected from the group consisting of carragenan, scleroglycan, xanthan, guar, hydroxypropylguar, hydroxyethylcellulose, carboxymethylhydroxyethylcellulose and copolymers or terpolymers of acrylamidemethyl propylene sulfonate, N,N-dimethylacrylamide and acrylic acid present in the suspension in an amount in the range of from about 0.1% to about 1.5% by weight of water therein. The most preferred polymer suspending agent for use in the above described suspension is carragenan.

A preferred method of cementing a well bore of this invention comprises the steps of: (a) storing a water-microsphere suspension for reducing the density of a well cement composition comprised of water, microspheres selected from the group consisting of fly ash microspheres, glass microspheres and recycled glass microspheres present in the suspension in an amount in the range of from about 25% to about 150% by weight of water therein and a microfine or colloidal suspending agent selected from the group consisting of carbon black, lignite, brown coal, humic acid, fumed silica, precipitated silica, polyvinyl alcohol latex, styrene-butadiene latex and surfactant micelle present in the suspension in an amount in the range of from about 25% to about 75% by weight of water therein; (b) combining the water-microsphere suspension with a cement composition comprised of a hydraulic cement and water; (c) introducing the cement composition including the water-microsphere suspension into the well bore; and (d) allowing the cement composition to set.

Another preferred method of cementing a well bore of the present invention comprises the steps of: (a) storing a water-microsphere suspension for reducing the density of a well cement composition comprised of water; microspheres selected from the group consisting of fly ash microspheres, glass microspheres and recycled glass microspheres present in the suspension in an amount in the range of from about 25% to about 150% by weight of water therein and a polymer suspending agent selected from the group consisting of carrageenan, scleroglycan, xanthan, guar, hydroxypropylguar, hydroxyethylcellulose, carboxymethyl-hydroxyethylcellulose and copolymers or terpolymers of acrylamidemethyl propylene sulfonate, N,N-dimethylacrylamide and acrylic acid present in the suspension in an amount in the range of from about 0.1% to about 1.5% by weight of water therein; (b) combining the water-microsphere suspension with a cement composition comprised of a hydraulic cement and water; (c) introducing the cement composition including the water-microsphere suspension into the well bore; and (d) allowing the cement composition to set.

In order to further illustrate the storable water-microsphere suspensions and methods of cementing in a well bore in accordance with the present invention, the following example is given.

EXAMPLE

Glass microspheres were suspended in fresh water containing 49% microfine carbon black by weight of the water to produce a suspension containing 89% glass microspheres by weight of the water. The suspension, identified as Sample No. 1, was stored and monitored over a period of 3 weeks. That is, the sample was examined for separation of the microspheres whereby they float on top of the water. If separation occurs, the microspheres form a cake on top of the suspension which prevents pouring or pumping of the suspension. Also, the development of free water and settling and whether the suspension was re-stirrable to its original consistency were monitored after 3 days and after 3 weeks. The results of these test are given in Table I below.

Fly ash microspheres were also suspended in fresh water containing 0.5% carragenan polymer by weight of the water to produce a suspension containing 50% fly ash microspheres by weight of the water. The suspension, identified as Sample No. 2, was also stored and monitored over a period of 3 weeks as described above for Sample No. 1. The results of these tests are also given in Table I below.

Portions of Sample No. 1 and Sample No. 2 suspensions were added to portions of a cement composition comprised of CEM 152.5 Portland hydraulic cement according to EN 197, fresh water in an amount sufficient to form a slurry, and a dispersing agent comprised of the condensation product of acetone, formaldehyde and sodium sulfite present in an amount of about 1.0% by weight of the hydraulic cement. The portions of the Sample No. 1 and Sample No. 2 suspensions were present in the cement composition portions in amounts of 117% and 120%, respectively, by weight of water in the cement composition portions.

Samples of the above described cement compositions were tested for rheologies and densities at room temperature and pressure, at 4,000 psi and at 125° F. The cement compositions were also tested for free water, settling, top/bottom densities and compressive strengths at 125° F. using a Universal Cement Analyzer. The results of these tests are given in Table II below.

TABLE I

Stability Of Microsphere Suspensions

| Suspension Sample | Suspension Sample No. | |
|---|---|---|
| Components, Properties And Stability | 1 | 2 |
| Water | | |
| Carbon Black, % by wt. of water | 49 | — |
| Carragenan, % by wt. of water | — | 0.5 |
| Glass Microspheres, % by wt. of water | 89 | — |
| Fly Ash Microspheres, % by wt. of water | — | 50 |
| Density At Atmospheric Pressure, lb/gal | 7.15 | 7.33 |
| Density At 4,000 psi, lb/gal | 7.15 | 8.25 |
| Rheology 300-200-100-6-3 | 131-101-66-19-15 | 105-90-71-35-3 |
| Stability: | | |
| After 3 days | no separation and free flowing | no separation and free flowing |
| After 3 weeks | no separation and free flowing | no separation and free flowing |

TABLE II

Properties Of Cement Compositions Containng Microsphere Suspensions

| Test Cement Sample Components And Properties | Cement Compositions Test Containing Microsphere Suspensions | |
|---|---|---|
| Portland cement CEM 52.5 | | |
| Water, % by wt. of cement | 44 | 44 |
| Dispersant[1], % wt. of cement | 1.0 | None |
| Sample No. 1 Suspension, % by wt. of water | 117 | None |
| Sample No. 2 Suspension, % by wt. of water | None | 120 |
| Density At Atmospheric Pressure, lb/gal | 12.0 | 11.9 |
| Density At 4,000 psi, lb/gal | 12.1 | 12.5 |
| Total Amount Of Water In Cement Composition, % by wt. of cement | 63.3 | 61.6 |
| Microsphere Flotation After Adding Test Suspension To Mix Water | None | None |
| Rheology At Atmospheric Temperature And Pressure, 300-200-100-60-30-6-3 | 87-69-49-40-32-24-23 | 30-23-14-11-8.5-7-6.5 |

TABLE II-continued

Properties Of Cement Compositions Containing Microsphere Suspensions

| Test Cement Sample Components And Properties | Cement Compositions Test Containing Microsphere Suspensions | |
|---|---|---|
| Density, lb/gal | 12.0 | 11.9 |
| Rheology At 4,000 psi, 300-200-100-60-30-6-3 | 87-69-50-42-34-25-24 | 53-42-30-25-21-17-15 |
| Density, lb/gal | 12.1 | 12.5 |
| Rheology At 125° F., 300-200-100-60-30-6-3 | 79-62-44-36-28-20-19 | 62-54-45-41-36-20-15 |
| Density, lb/gal | 12.0 | 12.5 |
| Freewater, % by vol. | — | 0.4 |
| Settling, % by vol. | — | 0 |
| Density, lb/gal | — | Gelled |
| Compressive Strength², at 125° F. | | |
| 50 psi at hrs:min | 6:24 | 1:56 |
| 500 psi at hrs:mm | 6:53 | 2:48 |
| psi at 24 hrs | 3750 | 2275 |
| psi at 72 hrs | 4634 | 2600 |
| Crush, psi | 4679 | 4297 |
| Cube Crush - 7 days, psi | 4688 | — |

[1]Condensation product of acetone, formaldehyde and sodium sulfite.
[2]Universal Cement Analyzer.

From Tables I and II, it can be seen that the microsphere suspensions of the present invention can be stored for at least 3 weeks while remaining stable and can be combined with hydraulic cement compositions without adverse results.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A storable water-microsphere suspension consisting essentially of:
   water;
   microspheres selected from the group consisting of fly ash, glass microspheres, recycled glass microspheres and synthetic hollow glass microspheres; and
   an effective amount of a suspending agent selected from the group consisting of microfine or colloidal materials and gel forming polymers;
   wherein said storable suspension does not separate for at least three weeks.

2. The suspension of claim 1 wherein said water is selected from the group consisting of fresh water and salt water.

3. The suspension of claim 1 wherein said microspheres are present in said suspension in an amount in the range of from about 25% to about 150% by weight of water in said suspension.

4. The suspension of claim 1 wherein said suspending agent is a microfine or colloidal material selected from the group consisting of carbon black, lignite, brown coal, humic acid, fumed silica, precipitated silica, polyvinyl alcohol latex, styrene-butadiene latex and surfactant micelle.

5. The suspension of claim 4 wherein the suspending agent is present in an amount in the range of from about 25% to about 75% by weight of water in said suspension.

6. The suspension of claim 1 wherein said suspending agent is a polymer selected from the group consisting of carragenan, scleroglycan, xanthan, guar, hydroxypropylguar, hydroxyethylcellulose, carboxymethyl-hydroxyethylcellulose and a copolymer or terpolymer of acrylamidemethyl propylene sulfonate, N,N-dimethylacrylamide and acrylic acid.

7. The suspension of claim 6 wherein the suspending agent is present in an amount in the range of from about 0.1% to about 1.5% by weight of water in said suspension.

8. The suspension of claim 1 wherein said suspending agent is present in said suspension in an amount in the range of from about 0.1% to about 75% by weight of said water in said suspension.

9. A storable water-microsphere suspension for use in well cement compositions consisting essentially of:
   water;
   microspheres selected from the group consisting of fly ash microspheres, glass microspheres and recycled glass microspheres; and
   a microfine or colloidal suspending agent selected from the group consisting of carbon black, lignite, brown coal, humic acid, fumed silica, precipitated silica, polyvinyl alcohol latex, styrene-butadiene latex and surfactant micelle;
   wherein said storable suspension does not separate for at least three weeks.

10. The suspension of claim 9 wherein said water is selected from the group consisting of fresh water and salt water.

11. The suspension of claim 9 wherein said microspheres are present in said suspension in an amount in the range of from about 25% to about 150% by weight of water in said suspension.

12. The suspension of claim 9 wherein the suspending agent is present in an amount in the range of from about 25% to about 75% by weight of water in said suspension.

13. The suspension of claim 9 wherein said microspheres are fly ash microspheres.

14. The suspension of claim 9 wherein said microfine or colloidal suspending agent is microfine carbon black.

15. A storable water-microsphere suspension for use in well cement compositions consisting essentially of:
   water;
   microspheres selected from the group consisting of fly ash microspheres, glass microspheres and recycled glass microspheres; and
   a polymer suspending agent selected from the group consisting of carragenan, scleroglycan, xanthan, guar, hydroxypropylguar, hydroxyethylcellulose, carboxymethylhydroxy-ethylcellulose and a copolymer or terpolymer of acrylamidemethyl propylene sulfonate, N,N-dimethylacrylamide and acrylic acid;
   wherein said storable suspension does not separate for at least three weeks.

16. The suspension of claim 15 wherein said water is selected from the group consisting of fresh water and salt water.

17. The suspension of claim 15 wherein said microspheres are present in said suspension in an amount in the range of from about 25% to about 150% by weight of water in said suspension.

18. The suspension of claim 15 wherein the suspending agent is present in an amount in the range of from about 0.1% to about 1.5% by weight of water in said suspension.

19. The suspension of claim 15 wherein said microspheres are fly ash microspheres.

20. The suspension of claim 15 wherein said polymer suspending agent is carragenan.

* * * * *